Figure 3:
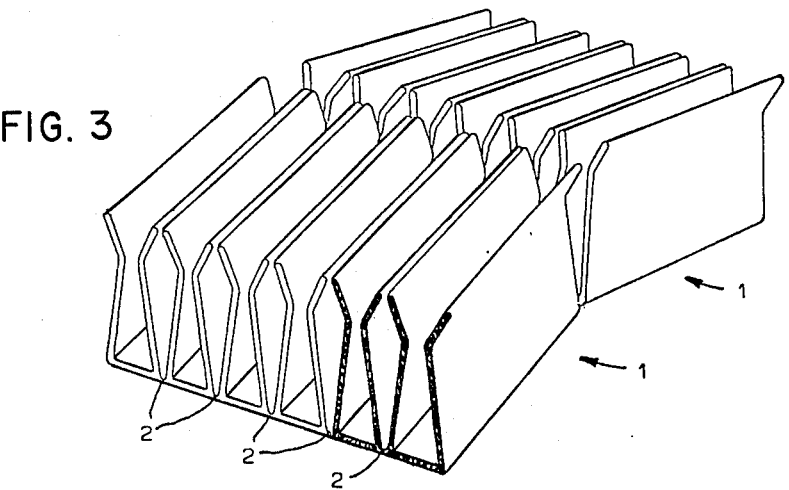

United States Patent

Hörholt et al.

[11] 4,296,524
[45] Oct. 27, 1981

[54] JOINING MEMBER

[76] Inventors: Anders Hörholt, 9 Avenue d'Ostende, Monte Carlo, Monaco; Ulrik Kvist, Virvelvägen 42, 184 00 Åkersberga, Sweden

[21] Appl. No.: 888,399

[22] Filed: Mar. 20, 1978

[30] Foreign Application Priority Data

Mar. 23, 1977 [SE] Sweden .................... 7703319

[51] Int. Cl.³ .............................................. E05D 7/00
[52] U.S. Cl. ............................. 16/150; 16/DIG. 13
[58] Field of Search ............... 16/DIG. 13, 150, 158, 16/187

[56] References Cited

U.S. PATENT DOCUMENTS 3,720,979  3/1973  Krawagna ........................... 16/150

FOREIGN PATENT DOCUMENTS 2346863  3/1975  Fed. Rep. of Germany .... 16/DIG. 13
1517445  2/1968  France .......................... 16/DIG. 13

Primary Examiner—H. Hampton Hunter
Attorney, Agent, or Firm—Witherspoon & Hargest

[57] ABSTRACT

Joining member for joining structure elements having plane connecting portions and comprising at least two substantially U-shaped profiles for receiving the plane connecting portions of the structure elements between the legs of the profiles. Means comprising thin webs made in one and the same piece as the profiles articulatingly connecting the profiles.

1 Claim, 7 Drawing Figures

JOINING MEMBER

The present invention relates to a joining member and more precisely to an articulated joining member admitting fixed as well as movable, temporary as well as permanent joining of structure elements having plane connecting portions such as boards made of e.g. plastic, steel, woodfibre, cardboard and the like.

The joining member in accordance with the present invention can be used for construction of models, toys, demonstration tables, boxes, fences and the like. Although it has been developed for building tools it is useful within many fields.

The joining member in accordance with the invention is made by extrucion of plastic, preferably polypropylene or polyamide due to which fact the joining member can be produced in practically unlimited lengths. The joining member can afterwards be cut into desired lengths either by the manufacturer or by the user.

The joining member in accordance with the invention consists of at least two profiles the cross-section of which are substantially U-shaped and which are articulatingly connected to each other by the aid of a thin web. The plane connecting portions included in the structure elements to be connected are inserted between the legs of the U-shaped profiles. As mentioned, the structure elements are normally constituted by boards the edges of which then are inserted between the legs. It is not necessary to have said edges treated but they can be covered completely by the legs provided that the joining members is of the same length as the board edges.

A very preferable field of use of the invention is foldable walls and boxes for temporary use in connection with pallets. It has namely been shown that the joining member is very durable and can be subjected to practically unlimited number of foldings simultaneously as it is of essentially lower weight then the metal hinges which are in use today in connection with such structures.

Previously known joining members comprises of U-shaped profiles or blocks in which notches have been cut, the angle between the joined elements then being fixed. In order to obtain an adjustable angle between joined elements two U-shaped profiles are used which have been connected by a conventional hinge pivot.

Hence, said constructions have no or very little flexibility, are not versatilely useful and are expensive to manufacture, especially if they have to include a hinge pivot. As distinguished threfrom the joining member in accordance with the present invention is simple and cheep to manufacture, due to the spring action of the U-shaped legs it is possible to adapt to elements of varying thicknesses, it is of low weight and it can be manufactured in continious lengths for later cutting into desired lengths.

The object of the present invention is to remove the drawbacks of previously known joining members. This object is reached by the member of the type referred to in the claims, from which also the features particularly characterizing the invention are clear.

Figure 1:
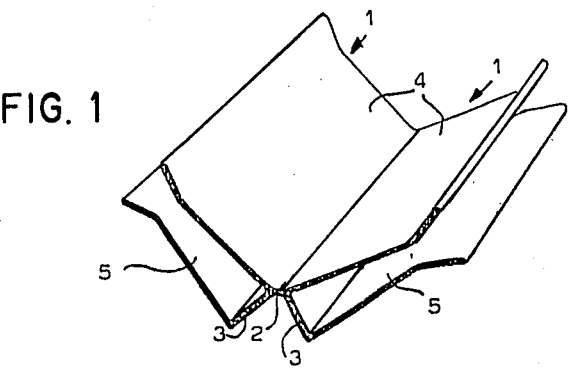
Figure 2:
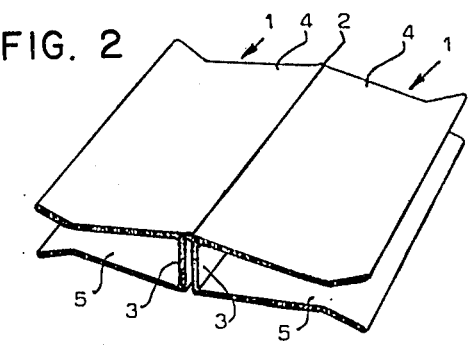
Figure 4:
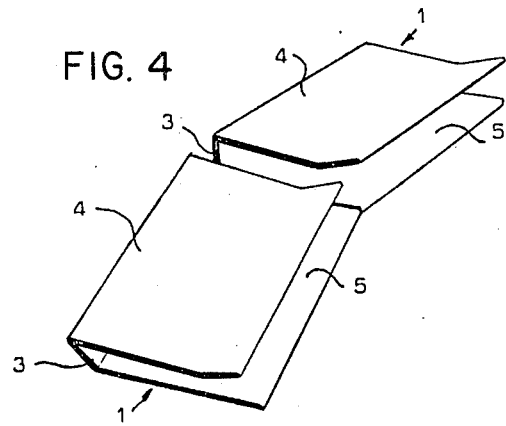
Figure 5:
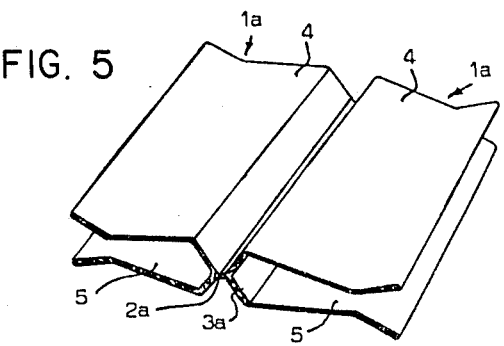
Figure 6:
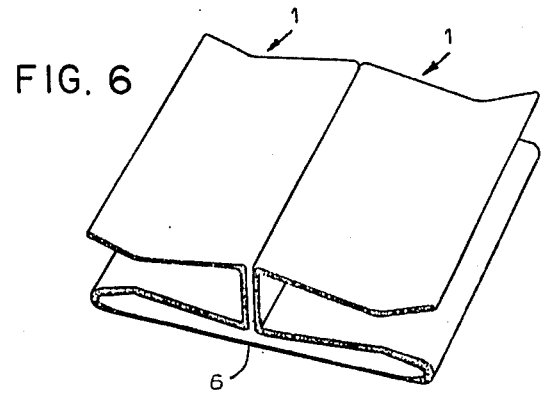
Figure 7:
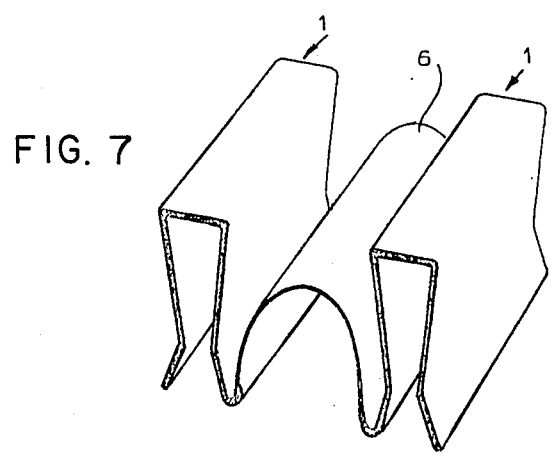

The invention is closer described in the following in connection with the attached drawings in which FIGS. 1 and 2 show a first embodiment of a joining member in accordance with the invention in two different folding postions, FIG. 3 shows a block of joining elements similar to the one shown in FIGS. 1 and 2, FIG. 4 shows a second embodiment of the joining member in accordance with the invention, FIG. 5 shows a third embodiment of the joining member in accordance with the invention, and FIGS. 6 and 7 show a fourth embodiment of the joining member in accordance with the invention.

The different embodiments of the invention shown in the drawings can as well be combined with each other for different fields of use.

In the basic embodiment of the invention shown in FIGS. 1 and 2 the joining member comprises of two essentially U-shaped profiles 1 which by a web 2 are articulatingly connected to each other. The bottom 3 of the U-shaped profile is substantially plane and forms a right or acute angle with the adjoining legs 4, 5. The width of the bottom 3 is similar to or a bit bigger than the thickness of the board for which the joining member is intended to be used. The web 2 extends between two adjacent corners between bottom and leg. Due to this structure the U-shaped profiles of the joining member are foldable between about 0° and 180°.

The outer portion of at least one of both the legs 4, 5 is preferably bent outwards so that a board easily can be inserted therebetween and corresponding inner portion is preferably bent inwards towards the other in order to give rise to a clamping action against the inserted board. If the clamping action is unsatisfactory in order to keep a board in place a nail or a screw or some other locking means can easily be provided through the legs and into the board. The legs can also be provided with engagement means such as barbs or rims on the inner surface in order to enhance the engagement of the board therebetween.

The joining member in accordance with the invention can also be made as including three or more profiles 5 which are connected by a web 2 as previously mentioned or also by one or more webs of the transverse direction of the profiles. An embodiment of the latter type is shown in FIG. 4. A combination of the embodiments shown in FIGS. 1 and 4 is shown in FIG. 3 in which the profiles form long articulated continuous strips to which the boards can be attached.

In the embodiment shown in FIG. 5 both the U-shaped profiles 1a are formed with a V-shaped bottom 3a, the connecting web 2a extending between the tips of the bottoms. By using different angles for the V-shaped bottom 3a the limits for the folding of the two profiles 1a in relation to each other can be determined.

The invention is primarily intended to be made from plastic in one single piece having the flexible web made as a thin portion of the material. In order to be able to use a cheeper plastic having a lower bendng strength than polyamide and polypropylene which is the preferred plastic, the web can be as shown in FIGS. 6 and 7 in the shape of a bridge 6 extended between the legs 1, the bridge 6 extending between the free ends of two legs. By such a structure the bending stresses are distributed over a larger surface and further, it gives rise to greater possibilities for adjustment than what is possible by previously described embodiments.

What is claimed is:

1. A joining member for joining structure elements having plane connecting portions comprisng at least two profiles the cross-section of each of which is substantially U-shaped for receiving said plane connecting portions between the legs of said U-shaped profiles, said U-shaped profiles including a V-shaped bottom from the arms of which said legs extend, a thin web made in one and the same piece as said U-shaped profiles extending between the tips of each of said V-shaped bottoms articulatingly connecting said profiles, and said arms of said V-shaped bottom extending at a pre-determined angle from each of said tips, the degree to which adjacent of said U-shaped profiles are foldable about said web relative to each other being dependent upon the degree of said angle.

* * * * *